United States Patent [19]

Nakamichi

[11] 3,749,851

[45] July 31, 1973

[54] TAPE-PAD FOR MAGNETIC RECORDING AND REPRODUCING APPARATUS

[75] Inventor: Niro Nakamichi, Tokyo, Japan

[73] Assignee: Nakamachi Research, Incorporated, Tokyo, Japan

[22] Filed: July 16, 1971

[21] Appl. No.: 165,419

[30] Foreign Application Priority Data

July 28, 1970 Japan .................................. 45/65902

[52] U.S. Cl. ..... 179/100.2 R, 179/100.2 Z, 274/4 R

[51] Int. Cl. .......................... G11b 5/00, G11b 5/40

[58] Field of Search ........... 179/100.2 C, 100.2 CA, 179/100.2 Z, 100.2 R; 274/4 R

[56] References Cited

UNITED STATES PATENTS

| | | | |
|---|---|---|---|
| 2,713,619 | 7/1955 | Eddy | 179/100.2 C |
| 2,981,805 | 4/1961 | Conly | 179/100.2 C |
| 3,432,838 | 3/1969 | Winkler | 179/100.2 C |
| 2,644,690 | 7/1953 | Krag | 179/100.2 R |

*Primary Examiner*—J. Russell Goudeau

*Attorney*—Leonard H. King

[57] ABSTRACT

The present invention relates to tape-pad means for magnetic recording and reproducing apparatus wherein the back of the pad for pressing the tape against the magnetic head is provided with a highly conductive plate, thereby decreasing the cross talk between magnetic heads adjacently arranged, by means of the eddy current flowing in the plate.

8 Claims, 7 Drawing Figures

INVENTOR
NIRO NAKAMICHI

BY

Leonard H King
Attorney

INVENTOR
NIRO NAKAMICHI
BY
Leonard H. King
Attorney

TAPE-PAD FOR MAGNETIC RECORDING AND REPRODUCING APPARATUS

The present invention relates to tape-pad means for magnetic recording and reproducing apparatus, and in particular to tape-pad means for decreasing the cross talk between magnetic heads adjacently arranged.

BACKGROUND OF THE INVENTION

In magnetic recording and reproducing apparatus, the writing head is often arranged in the vicinity of the reading head and in such a case the flux produced by the writing current interlinks the gap of the reading head, thereby inducing a voltage in the reading head. This voltage becomes the cross talk voltage. In general, tape-pads are used for pressing the tape to the head and tape-pad means are adopted which use cushion members such as felt or the like attached either on a base plate having high permeability such as permalloy in order to remove the influence of the external field or on a base plate such as soft iron in case where shielding of the external field is unnecessary. Because such a plate is of magnetic material, the cross talk becomes larger and it is therefore almost impossible to immediately read the written information for checking purpose or the like.

The present invention concerns a new invention avoiding the aforementioned drawback with respect to the prior art; and an object of the invention is therefore to provide a tape-pad means wherein the cross talk between magnetic heads adjently arranged can be decreased. Another object of the invention is to provide a tape-pad means having less friction. Briefly, the tappad means according to this invention provides a highly conductive plate with a low friction tape press member thereon which presses the tape against the magnetic head. In the conductive plate an eddy current will flow when writing, for example and thereby the writing leakage flux will be decreased, resulting in a decrease of the cross talk.

The invention will now be explained with reference to the attached drawings in which.

Figure 1:
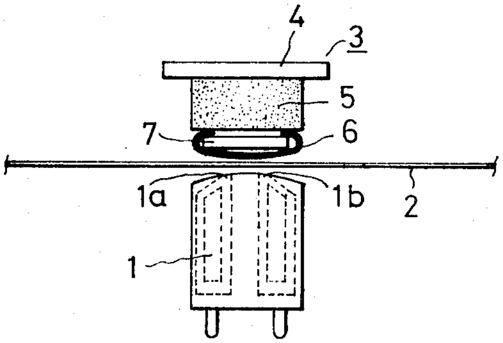
FIG. 1 is a plan view of an embodiment of the invention.
Figure 2:
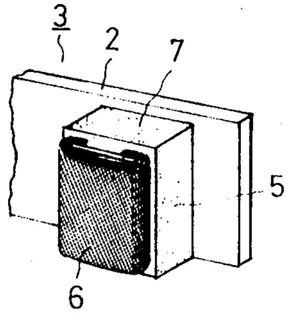
FIG. 2 is a perspective view of an essential part thereof.

Referring now to FIGS. 1 and 2, a tape-pad means 3 is arranged, confronting a magnetic head assembly 1 provided with a writing head gap 1*a* and a reading head gap 1*b*. The tape-pad means 3 presses the magnetic tape 2 against the magnetic head assembly 1 when writing or reading is performed. To the pad base plate 4 of the tape-pad means 3 a cushion member 5 made of for example foam rubber is attached. On the cushion member 5 a plate member 7 is attached which is made of a highly conductive material such as copper, aluminum and the like which is covered by a metal mesh 6 made of non-magnetic material such as stainless steel, the thickness of which is in the range of 0.5 to 1 mm. The non-magnetic metal mesh 6 covers at least the portion of the plate 7 which confronts the magnetic tape 2, since the mesh 6 constitutes the tape pressing member. It will be understood that the present invention is not limited to the magnetic head assembly as shown, but applies to any device wherein a writing head and a reading head are adjacently arranged and in particular to magnetic recording and reproducing apparatus which uses a cassette since such apparatus is small in size and generally uses a magnetic head assembly of the type described.

Because the apparatus according to this invention has a construction as mentioned above, the leakage flux from the writing head gap 1*a* will be dissipated in the form of an eddy current flowing in the conductive plate arranged in proximity to and confronting the writing head gap 1*a*, whereby the influence on the reading head gap 1*b* is substantially decreased. According to an experiment performed using this invention, it was ascertained that the leakage flux was reduced to about one-third to one-fifth as compared to the tape-pad means according to the prior art. As a result, it is possible to have a head assembly wherein the writing head gap and reading head gap are adjacently arranged possessing the function that it can read immediately the information written on the tape to effect checking.

Because the plate 7 is provided with a metal mesh 6 made of non-magnetic material at the portion confronting the magnetic tape, the friction against the tape 2 is remarkably reduced, whereby it becomes possible to increase the pressure of the tape-pad means 3 to ensure a close fitting of the tape against the tape head assembly 1. This decreases space loss and avoids such trouble as drop out of the felt, which often occurred in the prior art devices.

The cushion member 5 presses the magnetic tape 2 against the magnetic head assembly 1 with a uniform pressure by its resiliency.

Figure 3:
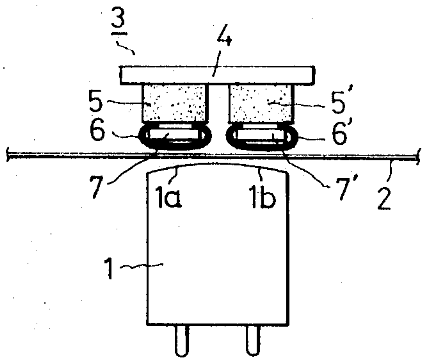
FIG. 3 is a plan view of another embodiment of the invention.

FIG. 3 illustrates another embodiment of the invention in which the tape-pad means consists of cushion members 5, 5′, metal meshes 6, 6′ and highly conductive plates 7, 7′, all of which are divided respectively, corresponding to writing head gap 1*a* and reading head gap 1*b*, and which are arranged side by side and fixed onto a single pad base plate 4. According to the structure described above, because writing head gap 1*a* and reading head gap 1*b* each have an independent pad means respectively, it is assured that magnetic tape 2 is pressed against the respective gap.

Figure 4:
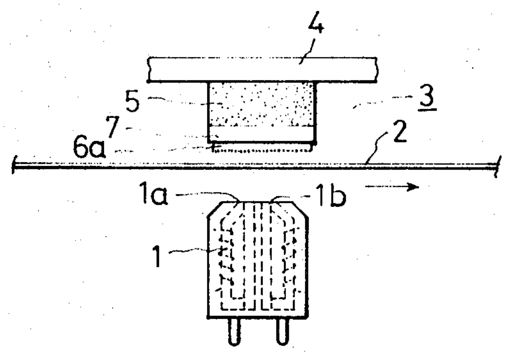
FIG. 4 is a plan view of still another embodiment of the invention.
Figure 5:
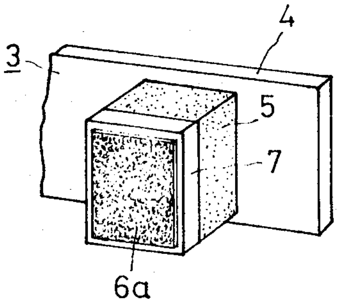
FIG. 5 is a perspective view of an essential part thereof.

FIGS. 4 and 5 illustrate still another embodiment, wherein a piled plate having high electric conductivity constitutes the tape pressing member 6*a*. The piling may be performed by any known electrostatic piling. All other items are identical with the previous figures and are like numbered.

Figure 6:
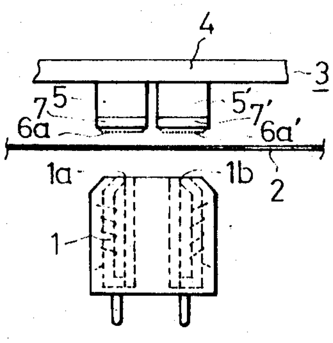
FIGS. 6 and 7 are plan views of additional embodiments of the invention.

FIG. 6 illustrates another embodiment which divides the tape member 6 of FIG. 4 into two portions 6*a*, 6*b*, respectively, corresponding to head gaps 1*a* and 1*b*. The reamining structure is similar to the embodiment shown in FIG. 3, and is like numbered. It will be understood that any material, not limited to the piling, can be used if the material has less friction and suitable resiliency. The embodiments of FIGS. 4 to 6 can suppress the leakage flux which interlinks head gaps 1*a* and 1*b* by means of the highly conductive plate 7, thus decreasing the cross talk as in the case of the embodiments shown in FIGS. 1 to 3.

Figure 7:
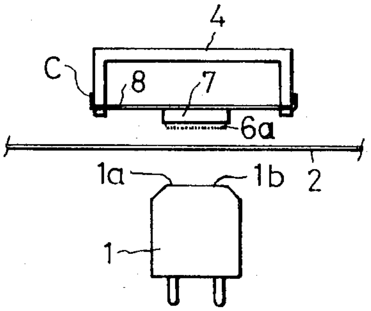

FIG. 7 illustrates still another embodiment of the invention, wherein a resilient plate 8 made of non-magnetic metal such a phosphor bronze is used instead of the aforementioned cushion member 5. Resilient plate 8 is extended between open end portions of a U-shaped base plate 4. A highly conductive plate 7 is attached to the resilient plate 8, and a tape pressing member *6a* is fixed onto the plate 7. Of course, the aforementioned metal mesh of FIGS. 1 – 3 can be used as the tape pressing member *6a*, as well as the piling of FIGS. 4 –6. In the embodiment shown, the resilient plate 8 can be attached to the base plate 4 so as not to move right or left and thus any change in the relative position between the magnetic head assembly 1 and the tape pressing member *6a* scarcely occurs thereby, maintaining a constant pressure condition. Therefore, the confidence for that will be improved.

As described above, according to the tape-pad means of the invention the cross talk between magnetic heads adjacently positioned can be decreased due to the provision of a highly conductive plate 7, thus enabling the checking of the information by reading it immediately after writing it onto the tape.

The fact that the cross talk can be decreased by a fixedly positioned plate of highly conductive material is known in the art, and the cross talk will be made smaller as the plate is positioned closer to the magnetic tape, but the charging of the magnetic tape will become more difficult. In the present invention, however, because the conductive plate is pressed to the magnetic tape only during operation, and is removed from the magnetic tape during the standstill, charging of the magnetic tape is very readily performed. Because the highly conductive plate can approach the magnetic head during the operation, the cross talk will be decreased most effectively.

There has been disclosed heretofore the best embodiment of the invention presently contemplated. However, it is to be understood that various changes and modifications may be made by those skilled in the art without departing from the spirit of the invention.

What I claim as new and desire to secure by Letters Patent is:

1. A tape-pad means for use with magnetic recording and reproducing apparatus having a magnetic reading head adjacent to a magnetic writing head, said means comprising a base plate, a resilient member connected to said base plate, a highly conductive plate supported by said resilient member, and a tape pressing member formed of a metal material connected to said conductive plate, said tape-pad means pressing the magnetic tape against the magnetic heads during operation of the magnetic heads.

2. A tape-pad means as in claim 1 wherein said tape pressing member is formed of a metal mesh.

3. A tape-pad means as in claim 1 wherein said resilient member is a of cushion material.

4. A tape-pad means as in claim 1 wherein said base plate is U-shaped, and said resilient member is connected across the open ends of said base plate.

5. A tape-pad means as in claim 4 wherein said resilient member is constructed of phosphor bronze material.

6. A tape-pad means as in claim 3 wherein said resilient member is constructed of a foam material.

7. A tape-pad means as in claim 1 wherein said tape-pad means is divided into two sections one confronting said magnetic reading head and one confronting said magnetic writing head.

8. A tape-pad means as in claim 1 wherein said tape pressing member is constructed of stainless steel.

* * * * *